United States Patent [19]

Cote

[11] Patent Number: 4,698,823
[45] Date of Patent: Oct. 6, 1987

[54] SYSTEM FOR REDUCING THE SENSITIVITY OF A RING LASER GYRO TO CHANGES IN A MAGNETIC FIELD

[75] Inventor: Laurence G. Cote, Thousand Oaks, Calif.

[73] Assignee: Litton Systems Inc., Beveraly Hills, Calif.

[21] Appl. No.: 649,564

[22] Filed: Sep. 12, 1984

[51] Int. Cl.$^4$ ............................................. H01S 3/08
[52] U.S. Cl. ...................................... 372/99; 372/94; 372/33; 356/350
[58] Field of Search ....................... 372/99, 94, 37, 33, 372/108; 356/350

[56] References Cited

U.S. PATENT DOCUMENTS 4,195,908  4/1980  Kestigian et al. .................. 356/350
4,272,194  6/1981  Gievers .............................. 356/350
4,540,284  9/1985  Gauert et al. ....................... 356/350

Primary Examiner—Leon Scott, Jr.
Attorney, Agent, or Firm—Gerald L. Cline

[57] ABSTRACT

A ring laser gyro is shown having a mirror designed for maximum reflectivity of parallel and perpendicularly polarized light at a frequency slightly greater or less than the frequency of the laser. In this configuration, the reflection of the preferred perpendicularly polarized light is reduced but slightly, while the reflection of the less desirable parallel polarized light is reduced significantly.

9 Claims, 3 Drawing Figures

SYSTEM FOR REDUCING THE SENSITIVITY OF A RING LASER GYRO TO CHANGES IN A MAGNETIC FIELD

FIELD OF THE INVENTION

The present invention relates to a system for reducing the sensitivity of a ring laser gyro to changes in a magnetic field, such as changes generated by the magnetic field of the earth as an aircraft in which the ring laser gyro is mounted flies from coast to coast. More particularly, the invention described herein incorporates a unique design which reduces the sensitivity of a ring laser gyro to changes in the earth's magnetic field and thus decreases the bias of the gyro while increasing its accuracy.

BACKGROUND OF THE INVENTION

The utilization of ring laser gyro wherein two beams of coherent light are propagated in opposite direction within a laser cavity is well known in the prior art. See, U.S. Pat. No. 3,382,758, issued May 14, 1968, entitled "Ring Laser Having Frequency Offsetting Means Inside Optical Path," by Chas C. Wang. The laser cavity is generally formed in a polygonal configuration, such as a triangle or quadrilateral, about a rotation sensitive axis perpendicular to the plane formed by the polygon.

A suitable laser medium produces two beams of coherent light which travel in opposite path directions, as stated above. Each beam of light returns to the starting point so that rotation of the ring laser about its axis will cause the beam travelling in the same direction as that rotational motion to traverse a longer path, while the beam travelling in the opposite direction traverses a shorter path. The difference in path lengths traversed by the two beams creates a different frequency between the two beams in proportion to the rotational rate of the ring laser cavity. The counter-rotating beams are then permitted to exit the ring laser cavity where they are heterodyned to extract a beat note. The rotational rate of the ring laser gyro can thus be determined by the frequency of the beat note which is directly proportional to the aforesaid rotation rate.

If the ring laser gyro is to be used within an aircraft, for example, it will be subject to variations of the earth's magnetic field as that aircraft flies from one point to another. These changes in the magnetic field cause a nonreciprocal phase shift between the counter-rotating beams which appears as a frequency change in the beat note.

The prior art recoqnized the susceptibility of a ring laser gyro to the earth's magnetic field. One prior art patent taught that it was possible to eliminate the sensitivity of a ring laser gyro to magnetic field by exposing the gyro to a biasing magnetic field. See, U.S. Pat. No. 4,213,705, issued July 22, 1980, entitled "Four Mode Zeeman Laser Gyroscope With Minimum Hole Burning Competition," by Virgil E. Sanders, at lines 30–39. Another invention by Virgil E. Sanders, Ser. No. 443,057, filed Nov. 19, 1982 as a continuation of an earlier filed application filed on June 2, 1980, entitled "Zeeman Multioscillator Ring Laser Gyro Insensitive To Magnetic Fields And Deturning Frequencies," discloses the utilization of a particular combination of laser medium isotopes to create a ring laser gyro that is insensitive to magnetic fields. Each of the approaches taught by the two patents referred to hereinabove has merit. However, there are other solutions to this problem.

SUMMARY OF THE INVENTION

The present invention was discovered and proven after an evaluation of different factors which cause a phase shift of the counter-rotating laser beams. These factors include the magnetic field, such as that created by the earth, the direction of propagation of the laser beams and the ellipticity of the polarized light which forms the laser beams. Bearing in mind that the nonreciprocal phase shift of a laser beam causes a corresponding frequency shift, the elimination or reduction of the phase shift due to a magnetic field will eliminate the sensitivity of the gyro to that field.

Of the three elements mentioned above, there is little that can be done about the variations of the earth's magnetic field. Some prior art gyros have attempted to eliminate this effect by placing each gyro within a magnetically shielded container. Similarly, there is little that can be done about the directional effect of the propagated laser beam. By directional effect, it is meant that a beam travelling with the direction of a magnetic field tends to be increased in frequency; while the same beam travelling in the opposite direction from the field tends to be decreased in frequency. Finally, the ellipticity of the polarized light may be considered.

Ideally, a ring laser gyro should have linearly polarized beams. However, various factors will cause a shift from the ideal linear polarized configuration. These factors include: mirror birefringence, out-of-planeness of the mirror, the relative reflectivity of the mirror of polarized light perpendicular to and parallel with the plane of incidence, and the Faraday effect caused by the rotation of the laser beams within the laser medium due to the presence of a magnetic field.

It is known and understood that the most desirable component of the counter-rotating laser beams is the linearly polarized component that is perpendicular to the plane of incidence. Conversely, the elimination of reflection of the polarized light that is parallel to the plane of incidence is desirable.

The present invention is the result of the unexpected discovery that the foregoing need to provide a highly reflective mirror for perpendicularly polarized light while providing a mirror that reduces the reflection of parallel polarized light may be accomplished by shifting the maximum reflection frequency of the mirror used within a ring laser gyro to a valve slightly greater than or less than the frequency of the laser.

DESCRIPTION OF THE DRAWINGS

A better understanding of the objects and advantages of the present invention will be had after reference to the following specification and drawings, wherein.

DESCRIPTION OF THE PREFERRED EMBODIMENT

Figure 1:
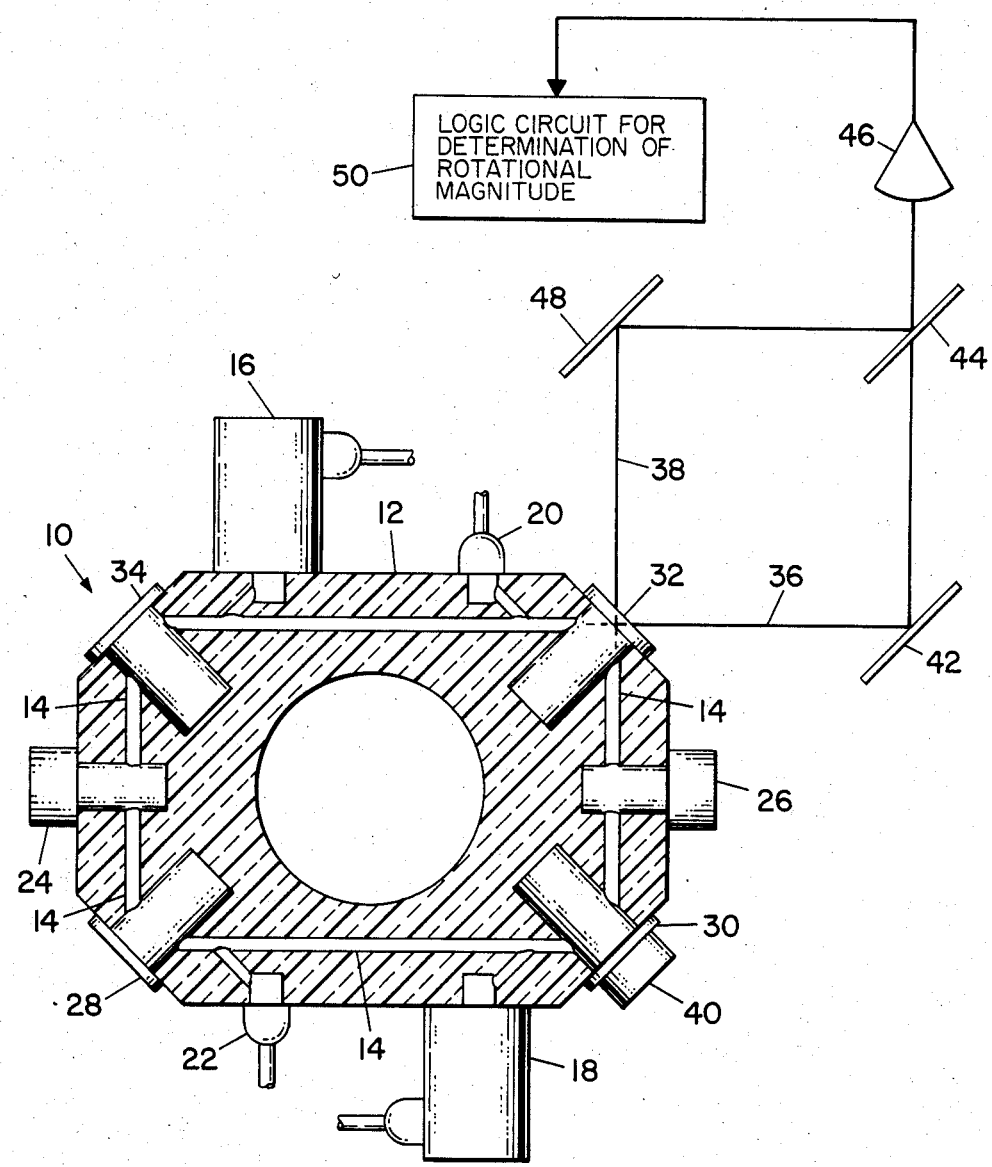
FIG. 1 is a cross-sectional view of a typical ring laser gyro assembly.

Referring to the drawings, FIG. 1 illustrates a typical gas laser 10, such as a helium neon laser, that may be utilized within a ring laser gyroscope incorporating the present invention. The laser is formed within a body 12 of low thermal expansion material, constructed with four passageways 14 to form a quadrilateral laser path or cavity therein. A triangular construction may also be used within the present invention. The passageways 14 are sealed to retain a gas mixture which forms the laser medium consisting of approximately 90% helium and 10% neon at a vacuum of approximately 3 torr, it being understood that atmospheric pressure is approximately 760 torr.

In accordance with known laser practice, the passageways 14 which form the laser cavity are provided with two cathodes, 16 and 18, and two anodes, 20 and 22, secured to the body 12 in a manner well-known in the art. A gas discharge is established between cathode 16 and anode 20 in upper passageway 14 as well as between cathode 18 and anode 22 in the lower passageway 14. Getters 24 and 26 may be provided on the right and left sides of body 12 for removing impurities from within passageways 14. Mirror 28, 30, 32 and 34 are located at the four corners of the quardrilateral cavity to direct the laser beams within the passageways 14 of the ring laser gyro 10. Mirrors 28 and 34 may be used solely for reflecting the laser beams 36 and 38 propagated in a clockwise and counterclockwise direction, respectively. Mirror 30 may have a piezoelectric element 40 attached thereto for moving the mirror in and out as part of the path length control system. Mirror 32 is partially reflective to permit a portion of the laser beams 36 and 38 incident upon its surface to pass through that mirror to be combined by heterodyning for providing rotational information.

As beam 36 passes through the partially reflective mirror 32 it strikes an external mirror 42 where it is reflected through a beam splitter 44 onto a photodiode 46. Beam 38 also passes through mirror 32 to strike a second external mirror 48 where it is reflected to the beam splitter 44 and reflected again to become approximately colinear with the beam 36. These beams strike the photodiode 46 simultaneously to generate a beat frequency by a heterodyning action. The beat frequency is detected by the photodiode 46, as described in U.S. Pat. No. 4,123,162, which issued on Oct. 31, 1978, entitled "Multioscillator Ring Laser Gyro Output Information Processing Method" by V. E. Sanders, assigned to the same assignee as the present invention, to determine the magnitude of the rotation of the ring laser gyro within a logic circuit for determination of rotational magnitude 50.

Laser beams 36 and 38 are ideally polarized in a linear direction perpendicular to the plane of incidence of light reflected from each mirror within the laser cavity. However, many factors, including the earth's magnetic field, will cause the rotation of this ideal beam from its perpendicular polarization to create an elliptically polarized beam having parallel and perpendicular components.

If the ring laser gyro 10 of the present invention is to be utilized within an aircraft, for example, it will be subject to shifts in the earth's magnetic field as that aircraft flies from one point to another. These changes in the magnetic field cause a rotation of the polarized beam as discussed above. They also cause a phase shift of that beam. A phase shift, in turn, causes a frequency change of the beam. As the ring laser gyro 10 is dependent upon frequency changes to provide the desired rotational information, the frequency change caused by the earth's magnetic field represents an undesirable error in the gyro's output expressed in degrees per hour which is also referred to as a bias. Evauluation of the phase shift indicates that it can be expressed as follows:

Phase Shift = B K Ellipticity Polarization where "B" represents the earth's magnetic field, and "K" is a unit vector of a propagated laser beam in the direction of propagation. "Ellipticity Polarization" represents the affect a mirror has upon the counter-rotating laser beams within the ring laser gyro 10. Ellipticity polarization includes several subfactors: mirror bifringence, out-of-planeness of the mirrors, the reflectivity of the mirrors of perpendicular and parallel polarized light, and the Faraday rotation of the polarized beam in the laser medium.

By careful evaluation of the foregoing factors it will be apparent that phase shift cannot be eliminated by manipulation of the earth's magnetic field B or the affective direction of the propagated laser beams K. However, the ellipticity polarization of the mirror may be manipulated.

Figure 2:
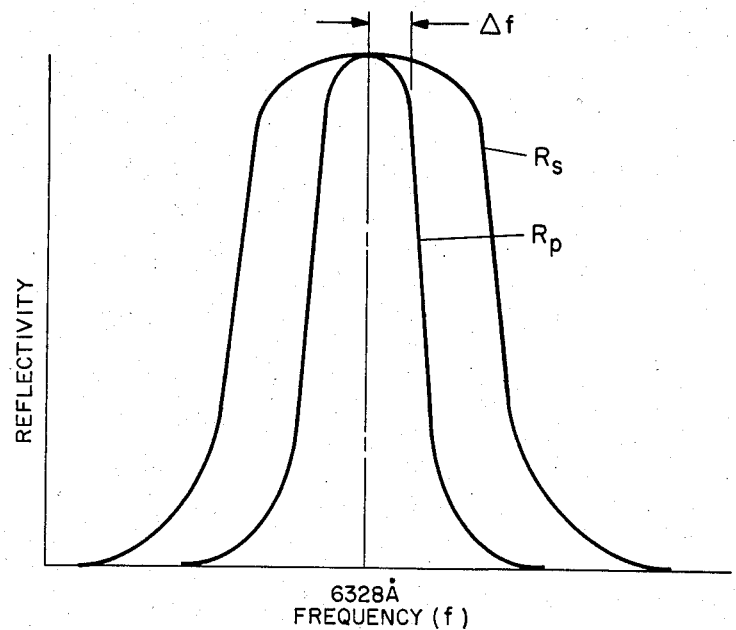
FIG. 2 is a curve showing the reflectivity of a birefringent mirror used by the present invention versus frequency.

Referring now to FIG. 2 a plot of the reflectivity versus frequency of a typical mirror manufactured from quarter wavelength thicknesses of birefringent material is shown. It will be noted that the reflectivity of the perpendicularly polarized light $R_s$ remains near its maximum for a wider frequency range than does the reflectivity of parallel polarized light $R_p$. The present invention utilizes this characteristic of a mirror formed by birefringent material by designing a mirror with its maximum reflectivity at a frequency other than the frequency of the laser. For example, a helium neon laser operates at 6,328 Angstroms. In the preferred embodiment, the mirrors of the ring laser gyro 10 are constructed to produce their maximum reflectivity at a frequency different from the frequency of the helium neon laser. If 6,400 Angstroms were used, for example, the reflectivity of the perpendicularly polarized light $R_s$ might change from 0.999865 to 0.99865. The reflectivity of the parallel polarized light $R_p$ would change from 0.99865 to 0.96, for example.

In the preferred embodiment, the mirrors 28–34 were constructed from seventeen quarter wavelength layers of birefringent material. One or more of the mirrors 28–34 may be constructed for maximum reflection at a frequency different from the laser frequency. It is important that $R_s$ remain at the highest value possible. If $R_s$ is decreased too much by moving the maximum reflective frequency of the mirror, $R_s$ may be increased by increasing the number of reflective quarter wavelength layers. However, $R_p$ will also be increased in proportion to $R_s$.

Figure 3:
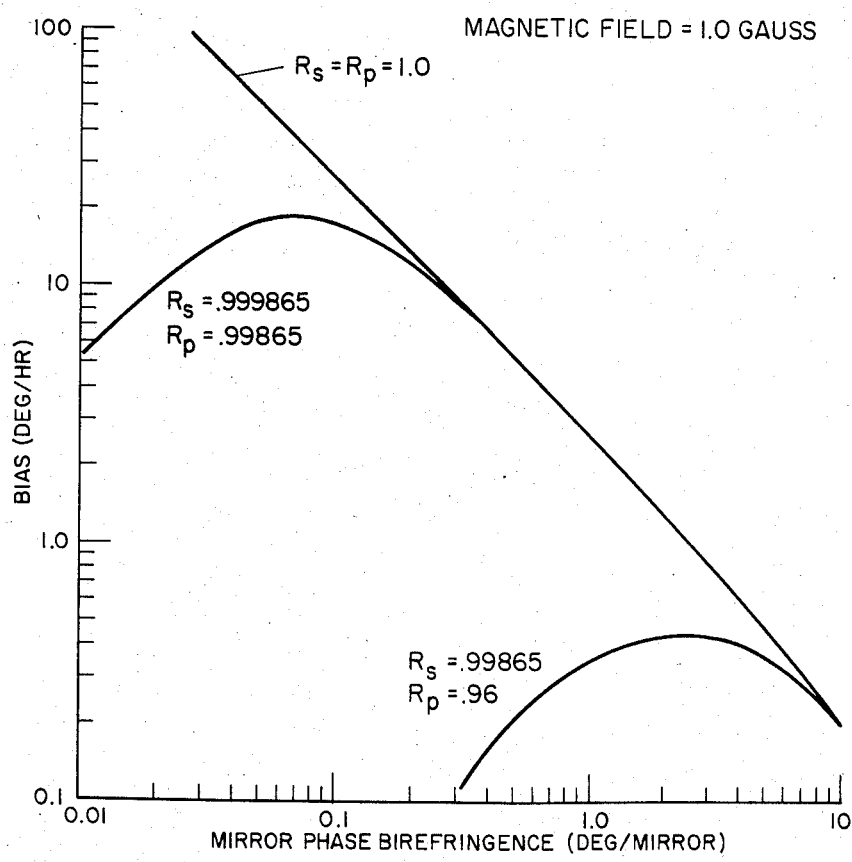
FIG. 3 is a curve showing bias shift of the ring laser gyro versus mirror phase birefringence.

Referring now to FIG. 3, a plot of laser bias in degrees per hour versus mirror phase birefringence in degrees per mirror is shown for a mirror exposed to a magnetic field of one gauss. The curve includes a plot, represented by a straight line, of the mirror bias versus mirror birefringence when $R_s$ equals $R_p$ equals 1.0. It will be seen from FIG. 3 that when the values of $R_s$ and $R_p$ are near equal, the bias of the ring laser gyro in degrees per hour is substantially higher than when the value of $R_s$ has been reduced slightly and the value of $R_p$ has been significantly reduced.

The significance of this mirror configuration should now become apparent. By designing a mirror with a maximum value for $R_s$ and a minimum value for $R_p$, it is possible to significantly improve the ability of the ring laser gyro mirrors 28–34 to reflect the perpendicularly polarized light $R_s$ while decreasing the reflection of the parallel polarized light $R_p$. This may be accomplished by simply shifting the design frequency of the mirror from the frequency generated by the laser to a slightly lower or slightly higher value. Obviously, the shift should not be so great as to fall off the peak of the $R_s$ curve, FIG. 2. However, the shift should be great enough to permit the value of $R_p$ to be significantly reduced.

The plot shown in FIG. 3 is a plot generated by a computer based upon mathematic equations. However, laboratory experimentation has borne out the accuracy of the predictions made by the computer plot shown in FIG. 3. FIG. 3 is incorporated here for the purpose of explaining the invention to the reader.

The present invention lends itself to modifications. Clearly lasers other than helium neon lasers may be used. The quadrilateral laser cavity may be replaced with a triangular cavity or any other polygonal configuration. Further, the mirrors within the laser cavity need not lie within a single plane. Accordingly, the present invention should be limited only by the appended claims.

I claim:

1. A system for reducing the sensitivity of a ring laser gyro to changes in a magnetic field, comprising:
   a laser cavity;
   means for propagating at least one laser beam through said laser cavity at a predetermined frequency;
   mirror means mounted within said laser cavity for directing said at least one laser beam within said laser cavity;
   said at least one laser beam having a polarized beam with a first, preferred component thereof polarized perpendicular to a plane of incidence of said mirror means, including a coating, and a second component thereof polarized parallel to said plane;
   said mirror means having a maximum reflectivity of said perpendicular and parallel polarized light beams at a frequency slightly offset from said predetermined frequency of said laser, wherein said mirror means causes said reflectivity of said perpendicular polarized light beam to remain near its maximum value while said reflectivity of said parallel polarized light beam is reduced whereby said sensitivity to said changes in said magnetic field is reduced.

2. A system for reducing the sensitivity of a ring laser gyro to changes in magnetic field, as claimed in claim 1, wherein:
   said laser beam within said laser cavity lies within a single plane.

3. A system for reducing the sensitivity of a ring laser gyro to changes in magnetic field, as claimed in claim 1, wherein:
   said at least one laser beam includes two counter-propagated beams within said laser cavity.

4. A system for reducing the sensitivity of a ring laser gyro to changes in magnetic field, as claimed in claim 1, wherein:
   said laser cavity includes four passageways which define a quadrilateral.

5. A system for reducing the sensitivity of a ring laser gyro to changes in magnetic field, as claimed in claim 1, wherein:
   said laser cavity includes three passageways which define a triangle.

6. A system for reducing the sensitivity of a ring laser gyro to changes in a magnetic field, comprising:
   a laser cavity;
   means for propagating counter-rotating laser beams within said laser cavity;
   at least three mirrors for reflecting said laser beams within said laser cavity;
   said laser beams having a first component of polarized light perpendicular to a plane of incidence of each of said mirrors and a second component thereof parallel to said plane;
   at least one of said mirrors having a reflective coating which maximizes the magnitude of said beam reflection of said polarized light perpendicular to said plane and reduces the magnitude of said polarized light parallel to said plane whereby said sensitivity to said magnetic field is reduced.

7. A system for reducing the sensitivity of a ring laser gyro to changes in magnetic field, as claimed in claim 6, additionally comprising:
   said laser propagating said counter-rotating laser beams at a predetermined frequency;
   at least one of said mirrors having a reflective coating with a maximum reflectivity at a frequency slightly offset from said predetermined frequency.

8. A system for reducing the sensitivity of a ring laser gyro to changes in magnetic field, as claimed in claim 6, wherein:
   said laser cavity includes four passageways which define a quadrilateral.

9. A system for reducing the sensitivity of a ring laser gyro to changes in magnetic field, as claimed in claim 6, wherein:
   said laser cavity includes three passageways which define a triangle.

* * * * *